United States Patent
Moore, III et al.

(10) Patent No.: US 10,492,620 B2
(45) Date of Patent: Dec. 3, 2019

(54) MATTRESS WITH NEEDLEPUNCHED, FLAME RETARDANT FABRIC BARRIER

(71) Applicants: Arnold Daniel Moore, III, Conover, NC (US); Emily Moore Roberts, Denver, NC (US)

(72) Inventors: Arnold Daniel Moore, III, Conover, NC (US); Emily Moore Roberts, Denver, NC (US)

(*) Notice: Subject to any disclaimer, the term of this patent is extended or adjusted under 35 U.S.C. 154(b) by 57 days.

(21) Appl. No.: 15/715,933

(22) Filed: Sep. 26, 2017

(65) Prior Publication Data
US 2019/0090653 A1    Mar. 28, 2019

(51) Int. Cl.
| | |
|---|---|
| *A47C 31/00* | (2006.01) |
| *D04H 1/02* | (2006.01) |
| *B32B 5/18* | (2006.01) |
| *A47C 27/045* | (2006.01) |

(52) U.S. Cl.
CPC ............ *A47C 31/001* (2013.01); *B32B 5/18* (2013.01); *D04H 1/02* (2013.01); *A47C 27/045* (2013.01); *B32B 2262/04* (2013.01)

(58) Field of Classification Search
USPC .................. 442/136; 428/920, 921
See application file for complete search history.

(56) References Cited

U.S. PATENT DOCUMENTS

| | | | |
|---|---|---|---|
| 5,891,547 A | 4/1999 | Lawless | |
| 6,151,731 A | 11/2000 | Saparow | |
| 6,846,759 B1 | 1/2005 | Copperwheat | |
| 7,180,032 B2 | 2/2007 | Child et al. | |
| 7,225,487 B2 | 6/2007 | Small et al. | |
| 7,281,281 B2 | 10/2007 | Langenberger | |
| 7,589,037 B2 | 9/2009 | Handermann et al. | |
| 7,858,542 B2 | 12/2010 | Mio et al. | |
| 8,003,555 B2 | 8/2011 | Tanaka et al. | |
| 8,008,218 B2 | 8/2011 | Small et al. | |
| 8,148,279 B2 | 4/2012 | Anantharamaiah et al. | |
| 8,163,664 B2 * | 4/2012 | Weller, Jr. ............ | A47C 27/122 428/920 |
| 8,839,496 B2 | 9/2014 | Link et al. | |
| 9,006,118 B2 | 4/2015 | Jones et al. | |
| 2003/0171055 A1 | 9/2003 | Endo et al. | |
| 2004/0062912 A1 | 4/2004 | Mason et al. | |
| 2004/0097156 A1 | 5/2004 | McGuire et al. | |
| 2004/0106347 A1 | 6/2004 | McGuire et al. | |
| 2005/0118919 A1 | 6/2005 | Link et al. | |
| 2006/0116043 A1 | 6/2006 | Hope et al. | |
| 2006/0150339 A1 | 7/2006 | McGuire et al. | |
| 2006/0183393 A1 | 8/2006 | Gillette | |
| 2006/0233957 A1 * | 10/2006 | Collins ................ | A47C 31/001 427/365 |
| 2007/0014960 A1 | 1/2007 | Emanuel et al. | |
| 2007/0283493 A1 | 12/2007 | Link et al. | |
| 2008/0254699 A1 | 10/2008 | Mio et al. | |

(Continued)

*Primary Examiner* — Lynda Salvatore
(74) *Attorney, Agent, or Firm* — Neo IP

(57) ABSTRACT

A non-flip mattress with top side and bottom side and depending edges; wherein the bottom side is covered with a flame-resistant, highly needled, double-sided-calendered, needlepunch nonwoven fabric that passes 16 CFR 1633. The nonwoven fabric is a double-calendered, 80/20 polyester/flame-resistant rayon blend needled with a minimum of 190 punches per $cm^2$ and with increased tensile strength.

20 Claims, 2 Drawing Sheets

(56) References Cited

U.S. PATENT DOCUMENTS

| | | |
|---|---|---|
| 2009/0233075 A1 | 9/2009 | Link et al. |
| 2014/0315461 A1 | 10/2014 | Schachtner et al. |
| 2015/0096125 A1 | 4/2015 | DeFranks et al. |
| 2015/0147518 A1 | 5/2015 | DeFranks et al. |
| 2015/0320231 A1 | 11/2015 | Small et al. |

* cited by examiner

MATTRESS WITH NEEDLEPUNCHED, FLAME RETARDANT FABRIC BARRIER

BACKGROUND OF THE INVENTION

1. Field of the Invention

The present invention relates to mattresses, and more specifically to flame-retardant mattress coverings.

2. Description of the Prior Art

It is generally known in the prior art to provide flame-retardant mattress coverings. It is also known to increase the density of materials by needlepunch and calendering.

Prior art patent documents include the following:

U.S. Patent Application No. 20150320231 for heat and flame-resistant materials and upholstered articles incorporating same by inventors Small et al. filed Jul. 22, 2015 and published Nov. 12, 2015 is directed to a mattress, foundation, or other upholstered sleep product or article includes a core and barrier material surrounding the core. The barrier material includes flame and heat-resistant material that is configured to prevent combustion of the core when the upholstered article is impinged with a gas flame according to California Technical Bulletin 603 of the State of California Department of Consumer Affairs. The barrier material may include an intumescent material that is configured to swell and char in the presence of a flame so as to form a barrier to the flame and to heat generated by the flame.

U.S. Patent Application No. 20150147518 for fire resistant panel including vertically oriented fire retardant treated fibers and an adaptive covering material by inventors DeFranks et al. filed Nov. 19, 2014 and published May 28, 2015 is directed to flame retardant panels generally include an adaptive cover layer and underlying batting layer. The cover layer includes a moisture vapor permeable synthetic fibrous layer, and a liquid impermeable but moisture vapor permeable thermoplastic layer disposed on an outer face of the cover layer, wherein the liquid impermeable but moisture vapor permeable thermoplastic layer is in an amount of about 2 to 15% by weight based on a total weight of the synthetic fibrous layer and the thermoplastic layer. The underlying batting layer can have a top surface and a bottom surface, the layer comprising a plurality of substantially vertically oriented flame retardant treated fibers extending from the top surface to the bottom surface; and a binder material.

U.S. Patent Application No. 20150096125 for fire resistant panel and methods of fire blocking an article by inventors DeFranks et al. filed Oct. 4, 2013 and published Apr. 9, 2015 is directed to flame retardant panels and methods of manufacture generally include a batting material including a layer having a top surface and a bottom surface, the layer comprising a plurality of substantially vertically oriented flame retardant treated fibers extending from the top surface to the bottom surface; and a binder material.

U.S. Patent Application No. 20140315461 for cellulosic fiber with hydrophobic properties and high softness and process for production thereof by inventors Schachtner et al. filed Oct. 11, 2012 and published Oct. 23, 2014 is directed to hydrophobic cellulose fibers which are biodegradable, extra soft and water repellent. Nonwovens comprising the inventive cellulosic fibers show also higher softness. Said fibers add bulk, better drape ability and hydrophobicity to nonwoven fabrics which are biodegradable if made only from Cellulosic fibers.

U.S. Patent Application No. 20090233075 for flame blocking liner materials by inventors Link et al. filed Apr. 27, 2009 and published Sep. 17, 2009 is directed to a fire blocking non-woven textile containing a first carded web of char-forming fibers containing aramid or melamine/formaldehyde fiber and a second carded web of oxygen-depleting fibers comprising a blend of polyacrylonitrile copolymer with a halogen comonomer and a polyester polymer. The webs may be needled-punched or thermally bonded and remain as separate layers separating the action of the char forming and oxygen depleting layers to optimize char strength, provide a light weight product, which may satisfy 16 CFR 1633 at thicknesses of up to 3.0 mm.

U.S. Patent Application No. 20080254699 for flame retardant bedding product by inventors Mio et al. filed Mar. 3, 2006 and published Oct. 16, 2008 is directed to a bedding product, such as a pillow or cushion, that satisfactorily drawing out peculiar softness and comfort possessed by an internal filling material, realizes comfort and high flame retardance without detriment to the excellent drape and tactile sensation possessed by a fiber material of flame shielding cloth. There is provided a flame retardant bedding product comprising an internal filling material covered by a flame shielding cloth made of fibers containing 5 to 60 wt. % halogenous fiber (A), 5 to 60 wt. % flame retardant cellulose fiber (B), 0 to 75 wt. % cellulose fiber (C) and 0 to 50 wt. % polyester fiber (D).

U.S. Patent Application No. 20070283493 for fire blocking removable cover by inventors Link et al. filed Jun. 7, 2007 and published Dec. 13, 2007 is directed to a flame-retardant removable cover which may be applied to a mattress. The removable cover, when applied to mattress, may reduce the peak heat release rate and/or total energy released in accordance with 16 CFR 1633 testing protocols. The cover may comprise a non-woven material. The removable cover may also comprise a non-woven type construction and an elastomeric material. The removable cover may therefore be designed with respect to the different requirements of those mattresses to which it may be applied to assist in meeting open flame mattress flammability standards.

U.S. Patent Application No. 20070014960 for fire retardant binding tape for mattresses by inventors Emanuel et al. filed Jul. 18, 2005 and published Jan. 18, 2007 is directed to a fire-retardant binding tape. The binding tape is employed to affix the butt splice joint (or overlapping joint) between rolls of fire retardant material, where one roll ends and another begins. Should the binder tape be subject to elevated temperatures, it will shrink toward the joint seam, thus strengthening the seam, and form a char that minimizes heat input to the flammable materials (foam) located beneath the fire-retardant barrier material. The nonwoven binding tape has fire retardant cellulosic fibers, a low melt binder, and an adhesive on one side used to affix the binding tape to the edge butted pieces of a flame retardant barrier material. Instead of the low melt binder, the fibers may be mechanically secured. Optionally a carrier film layer may be used to make the tape more rigid.

U.S. Patent Application No. 20060183393 for drapeable and launderable light weight flame retardant barrier fabrics by inventors Gillette et al. filed Feb. 13, 2006 and published Aug. 17, 2006 is directed to flame retardant (FR) nonwoven fabrics and methods of producing same are provided. An FR nonwoven fabric includes FR rayon and either FR polyester or FR polypropylene or any blend thereof. The FR nonwoven fabric has a basis weight less than 3 ounces per square yard, and is devoid of non-FR binder material. The FR nonwoven fabric displays substantial flame retardant properties after five home launderings in accordance with protocols set forth in AATCC Test Method 135-1995. The FR nonwoven fabric is configured to maintain flame and heat resistant integrity when impinged with a gas flame in accordance with testing protocols set forth in Technical Bulletin 604 of the State of California Department of Consumer Affairs (TB-604), and to maintain flame and heat resistant integrity when impinged with a gas flame in accordance with testing protocols set forth in National Fire Protection Agency 701-1989 test method.

U.S. Patent Application No. 20060150339 for lofted lightly needlepunched flame-retardant nonwovens by inventors Mcguire et al. filed Feb. 13, 2006 and published Jul. 13, 2006 is directed to a flame retardant (FR) lofted lightly needlepunch nonwoven fabric useful in household goods and particularly for mattresses. The nonwoven fabric comprises at least one of FR rayon fiber, FR acrylic fiber, FR melamine fiber, FR polyester fiber, FR polyolefin fiber, or FR resin coated fiber and nonbonding, non-FR synthetic and/or natural fiber mechanically bound together by a needlepunch process. The present invention also contemplates a mattress constructed from the FR lofted lightly needlepunch nonwoven fabric comprising FR rayon fiber, FR acrylic fiber, FR melamine fiber, FR polyester fiber, FR polyolefin fiber, or FR resin coated fiber. The mattress from this construction passes the California Test Bulletin 603 stringent conditions for mattresses used in residential places. Preferably the nonwoven fabric has a batt weight of at least 2.25 oz./sq.yd. and preferably between 2.25 oz./sq.yd. and 20 oz./sq.yd.

U.S. Patent Application No. 20060116043 for flame resistant fiber blend and fabrics made therefrom by inventors Hope et al. filed Nov. 30, 2004 and published Jun. 1, 2006 is directed to a flame retardant or flame resistant (FR) fiber blend is provided that comprises amorphous silica fibers and at least one FR fiber. A flame retardant fabric, manufactured from a blend of fibers comprises amorphous silica fibers and at least one FR fiber. Barrier fabrics, manufactured from a blend of fibers, are provided comprising amorphous silica fibers and at least one FR fiber.

U.S. Patent Application No. 20050118919 for flame blocking liner materials by inventors Link et al. filed Aug. 9, 2004 and published Jun. 2, 2005 is directed to a fire blocking non-woven needle-punched textile structure, comprising a first fiber component containing polyacrylonitrile copolymer with a halogen containing monomer, a second fiber component comprising a viscose fiber containing silicic acid or a regenerated cellulose fiber and a third fiber component comprising an aramid fiber or a melamine/formaldehyde fiber or a polyester fiber.

U.S. Patent Application No. 20040106347 for needlepunch flame-retardant nonwovens by inventors McGuire et al. filed Nov. 14, 2003 and published Jun. 3, 2004 is directed to a flame retardant (FR) nonwoven fabric useful in household goods and particularly for mattresses. The nonwoven fabric comprises at least one of FR rayon fiber, FR acrylic fiber, FR melamine fiber, FR polyester fiber, FR polyolefin fiber, or FR resin coated fiber and optionally synthetic and/or natural fiber mechanically bound together by a needlepunch process. From this nonwoven fabric, many household goods such as drapes, curtains, rugs, bedding and particularly mattresses may be constructed. The present invention also contemplates a mattress constructed from the nonwoven fabric comprising FR rayon fiber, FR acrylic fiber, FR melamine fiber, FR polyester fiber, FR polyolefin fiber, or FR resin coated fiber. The mattress from this construction passes the California Test Bulletin 603 stringent conditions for mattresses used in residential places. Preferably the nonwoven fabric has a batt weight of at least 2.25 oz./sq. Yd. And preferably between 2.25 oz./sq. Yd. And 20 oz./sq. Yd.

U.S. Patent Application No. 20040097156 for flame-retardant nonwovens by inventors McGuire et al. filed Nov. 18, 2002 and published May 20, 2004 is directed to a flame retardant (FR) nonwoven fabric useful in household goods and particularly for mattresses. The nonwoven fabric comprises from about 6 to 25 weight % of a low melt binder, and least one of FR rayon fiber, FR acrylic fiber, FR melamine fiber, or FR resin and optionally synthetic and/or natural fiber. From this nonwoven fabric, many household goods such as drapes, curtains, rugs, bedding and particularly mattresses may be constructed. The present invention also contemplates a mattress constructed from the nonwoven fabric comprising FR rayon fibers, FR acrylic fibers, FR resin, and non-FR polyester fibers, and about 6 to about 25 weight % low melt binder. The mattress from this construction passes the California Test Bulletin 129 stringent conditions for mattresses used in public places. Preferably the nonwoven fabric has a batt weight of at least 5 oz./sq. Yd. And preferably between 5 oz./sq. Yd. And 20 oz./sq. Yd.

U.S. Patent Application No. 20040062912 for flame blocking liner materials by inventors Mason et al. filed Oct. 1, 2002 and published Apr. 1, 2004 is directed to a fire blocking non-woven needlepunched textile structure, comprising a first fiber component containing polyacrylonitrile copolymer with a halogen containing monomer and a second fiber component. The second fiber component is selected such that it supports the first fiber component during burning, optionally including an inorganic filler as a coating for the first and second fiber components. In alternative embodiment, the present invention provides a fire blocking non-woven textile structure containing the above first and second fiber components, blended with a third binder fiber component in the form of a vertically lapped nonwoven structure.

U.S. Patent Application No. 20030171055 for material for flame-retardant sheet by inventors Endo et al. filed Mar. 31, 2003 and published Sep. 11, 2003 is directed to a flame retardant sheet material that simultaneously affords good flame retardancy and melting resistance in a sheet material in which a nonwoven is used, and also simultaneously provides good abrasion resistance and an excellent design, making it suitable for use in automotive trim surface materials. A flame retardant sheet material is obtained by first needle-punching and then stitch-bonding a web containing 70 to 95 wt % base fiber and 5 to 30 wt % flame retardant fiber selected from among flame retardant rayon fiber and modacrylic fiber. It is preferable for propoxyphosphazene or another such phosphoric ester-based flame retardant to be kneaded into the flame retardant fiber. It is also preferable to add a binder fiber to the web in order to improve abrasion resistance.

U.S. Pat. No. 9,006,118 for flame resistant filler cloth and mattresses incorporating same by inventors Kinlaw et al. filed Jan. 22, 2013 and issued Apr. 14, 2015 is directed to a filler cloth that includes cellulosic fibers treated with a flame retardant chemistry such that the filler cloth has a char length of less than about nine inches when tested in accordance with NFPA 701, such that thermal shrinkage of the filler cloth at 400° F. Is less than about 35% in any direction, and such that the filler cloth maintains flame and heat resistant integrity when impinged with a gas flame in accordance with testing protocols set forth in Technical Bulletin 603 of the State of California Department of Consumer Affairs. The filler cloth cellulosic fibers are treated with a flame retardant chemistry such that the filler cloth has a Frazier air permeability of less than about 400 cfm and a thermal resistance rating of at least about 3 when tested according to NFPA 2112.

U.S. Pat. No. 8,839,496 for flame blocking liner materials by inventors Link et al. filed Nov. 20, 2012 and issued Sep. 23, 2014 is directed to a fire blocking non-woven textile containing a first carded web of char-forming fibers containing aramid or melamine/formaldehyde fiber and a second carded web of oxygen-depleting fibers comprising a blend of polyacrylonitrile copolymer with a halogen comonomer and a polyester polymer. The webs may be needled-punched or thermally bonded and remain as separate layers separating the action of the char forming and oxygen depleting layers to optimize char strength, provide a light weight product, which may satisfy 16 CFR 1633 at thicknesses of up to 3.0 mm.

U.S. Pat. No. 8,148,279 for staple fiber durable nonwoven fabrics by inventors Pourdeyhimi et al. filed Apr. 9, 2009 and issued Apr. 3, 2012 is directed to durable nonwoven fabrics comprising staple fibers. Methods of preparing durable nonwoven fabrics based on staple fibers are also provided. The methods can include the steps of at least one of needle punching and hydroentangling. The durable nonwoven fabric can be subjected to additional bonding techniques, such as resin bonding and/or thermal bonding. The durable nonwoven fabrics of the invention provide improved durability over conventional nonwoven fabrics. Further advantages of the inventive nonwoven fabrics include maintaining the smooth surface qualities of the fabric and desirable feel of the fabric even with the enhanced durability. The inventive nonwoven fabrics can also be subjected to additional post-processing techniques that conventional nonwoven fabrics would otherwise be unable to withstand. Further, inks and/or dyes can more readily become adhered to the smooth nature of the surfaces of the inventive durable nonwoven fabrics.

U.S. Pat. No. 8,008,218 for multi-layered textile structures for flame resistant mattresses by inventors Small, Jr. Et al. filed Oct. 11, 2007 and issued Aug. 30, 2011 is directed to mattress panels and mattresses (including mattress foundations) that satisfy the rigorous requirements of new and promulgated state and federal regulations regarding flammability of mattresses, such as Technical Bulletin 603 of the State of California department of Consumer Affairs (TB-603) and U.S. Consumer Product Safety Commission Standard for Flammability of Mattresses and Mattress/Foundation Sets (16 CFR 1633), are provided. A mattress includes one or more panels of material assembled as a non-quilted, non-perforated, multi-layered structure, wherein the mattress maintains flame and heat resistant integrity when impinged with a gas flame in accordance with the testing protocol set forth in Technical Bulletin 603 of the State of California department of Consumer Affairs (TB-603) and/or in accordance with the testing protocol set forth in U.S. Consumer Product Safety Commission Standard for Flammability of Mattresses and Mattress/Foundation Sets (16 CFR 1633).

U.S. Pat. No. 8,003,555 for flame retardant synthetic fiber, flame retardant fiber composite, production method therefor and textile product by inventors Ebisu et al. filed Jul. 21, 2009 and issued Aug. 23, 2011 is directed to a flame retardant synthetic fiber and a flame retardant fiber composite that satisfy high flame retardance and high fire resistance, a method for producing the flame retardant synthetic fiber and the flame retardant fiber composite, and a textile product are provided. The flame retardant synthetic fiber of the present invention includes a polymer (1) containing 30 to 70 parts by mass of acrylonitrile, 70 to 30 parts by mass of a halogen-containing vinylidene monomer and/or a halogen-containing vinyl monomer, and 0 to 10 parts by mass of a vinyl-based monomer copolymerizable therewith, based on 100 parts by mass of the polymer, and at least one kind of a metal compound (2) that accelerates a dehalogenation reaction of the polymer (1) during burning and a carbonization reaction of the polymer (1) during burning, wherein the flame retardant synthetic fiber has a shrinkage variation of 45% or less when a temperature is raised from 50° C. To 300° C. Under a load of 0.0054 mn/dtex.

U.S. Pat. No. 7,858,542 for flame-retardant mattress by inventors Matsumoto et al. filed Oct. 21, 2005 and issued Dec. 28, 2010 is directed to a flame-retardant knit fabric which can exhibit texture and comfort inherent to materials such as cotton and urethane foam used for upholstered furniture such as a mattress and chair and bedding products such as a pillow, mattress pad and bedding, the flame-retardant knit fabric which can provide these products with high flame retardance. The internal structure of a mattress is covered with a flame-retardant knit fabric that comprises at least two fibers selected from the group consisting of (A) a halogen-containing fiber, (B) a cellulosic fiber, (C) a flame-retardant cellulosic fiber and (D) a polyester fiber, has a weight per unit area of at least 140 g/m$^2$ and a thickness of at least 0.5 mm, and contains a flame retardant at a ratio of at least 2% by weight based on the while fabric.

U.S. Pat. No. 7,589,037 for slickened or siliconized flame-resistant fiber blends by inventors Handermann et al. filed Jan. 12, 2006 and issued Sep. 15, 2009 is directed to slickened or siliconized flame-resistant fiber blends that are well suited for use in mattresses, box-springs, upholstered furniture, fiber-filled bed clothing, transportation seating or any end use application where soft materials are desired for flame resistant (FR) purposes. Some of the fibers in the blend are slickened. The FR fibers incorporated into these blends include both char forming FR fibers and oxygen depleting FR fibers. FR char-forming fibers are those which exhibit little shrinkage when exposed to direct flame and are not spun from polymers manufactured with halogenated monomers. Oxygen depleting FR fibers are spun from polymers manufactured with halogenated monomers.

U.S. Pat. No. 7,281,281 for dust ruffle stabilizer by inventors Nancy Langenberger et al. filed Sep. 15, 2005 and issued Oct. 16, 2007 is directed to a dust ruffle stabilizer having a flexible covering for a foundation or box-spring. Side sections of the covering include adhesive for removably engaging a corresponding inner side of a skirt of a bed skirt against the adhesive surface the side section.

U.S. Pat. No. 7,225,487 for heat and flame-resistant materials and upholstered articles incorporating same by inventors Fraser, Jr. Et al. Filed Oct. 12, 2006 and issued Jun. 5, 2007 is directed to a mattress, foundation, or other upholstered sleep product or article includes a core and barrier material surrounding the core. The barrier material includes flame and heat-resistant material that is configured to prevent combustion of the core when the upholstered article is impinged with a gas flame according to California Technical Bulletin 603 of the State of California Department of Consumer Affairs. The barrier material may include an intumescent material that is configured to swell and char in the presence of a flame so as to form a barrier to the flame and to heat generated by the flame.

U.S. Pat. No. 7,180,032 for channeled warming mattress and mattress pad by inventors Child et al. filed Oct. 24, 2005 and issued Feb. 20, 2007 is directed to a warming mattress and mattress pad incorporating channeled areas for accepting heat and sensor wires. The inventive mattress and mattress pad includes an arrangement of seam structures defining channels housing substantially discrete elongate heating and sensing elements arranged in a substantially similar pattern within the mattress or mattress pad interior.

U.S. Pat. No. 6,846,759 for adhesive coated polyester felt by inventors Stephen D. Copperwheat filed Sep. 24, 2001 and issued Jan. 25, 2005 is directed to a method of making a soft, well cushioned, fabric suitable for use in an automotive interior, furniture and upholstery. The fabric which is formed by depositing a coating of a high temperature adhesive having a viscosity of $6\times10^4$ to $75\times10^{4\ centipoise}$ at its application temperature on one surface of a felt cloth followed by laying down a layer of a second material on top of the adhesive-coated surface of the felt cloth to form a composite. The composite is then passed through a hot pinch point to firmly bond the second layer to the felt cloth.

U.S. Pat. No. 6,151,731 for universal dust ruffle by inventors Saparow et al. filed Apr. 9, 1998 and issued Nov. 28, 2000 is directed to a dust ruffle for a bed, including one or more panels having a skirt portion which drapes over the box-spring to adjacent the floor, and a shelf portion formed from a non-slip material such as needlepunch. The shelf portion is inserted between the box-spring and mattress of the bed, and the drop of the skirt portion is adjusted by selectively varying the depth of insertion of the shelf portion. The ends of the panels can be folded in a lengthwise direction to conform to the length and width of the particular bed. U.S. Pat. No. 5,891,547 for needle punch nonwoven component for refastenable fastening device by inventors Barbara J. Lawless filed Feb. 4, 1997 and issued Apr. 6, 1999 is directed to a nonwoven fabric for a hook and loop fastening device wherein the fabric comprises needlepunched fibers forming a plurality of loops which are effective for releasably engaging the hooks in a hook component, wherein the fabric has a weight of about 1.5 to about 4.0 ounces/sq. yd., and a thickness of about 0.015 inches to about 0.050 inches. The product may be used as fastening device for disposable products.

SUMMARY OF THE INVENTION

The present invention relates to a non-flip mattress with a flame-retardant bottom fabric.

It is an object of this invention to provide a non-flip mattress with a flame-retardant bottom fabric.

In one embodiment, the present invention is a non-flip mattress with top side and bottom side and depending edges; wherein the bottom side is covered with a flame retardant, highly needled, double-sided-calendered, needlepunch nonwoven fabric that passes 16 CFR 1633.

These and other aspects of the present invention will become apparent to those skilled in the art after a reading of the following description of the preferred embodiment when considered with the drawings, as they support the claimed invention.

DETAILED DESCRIPTION

Figure 1:
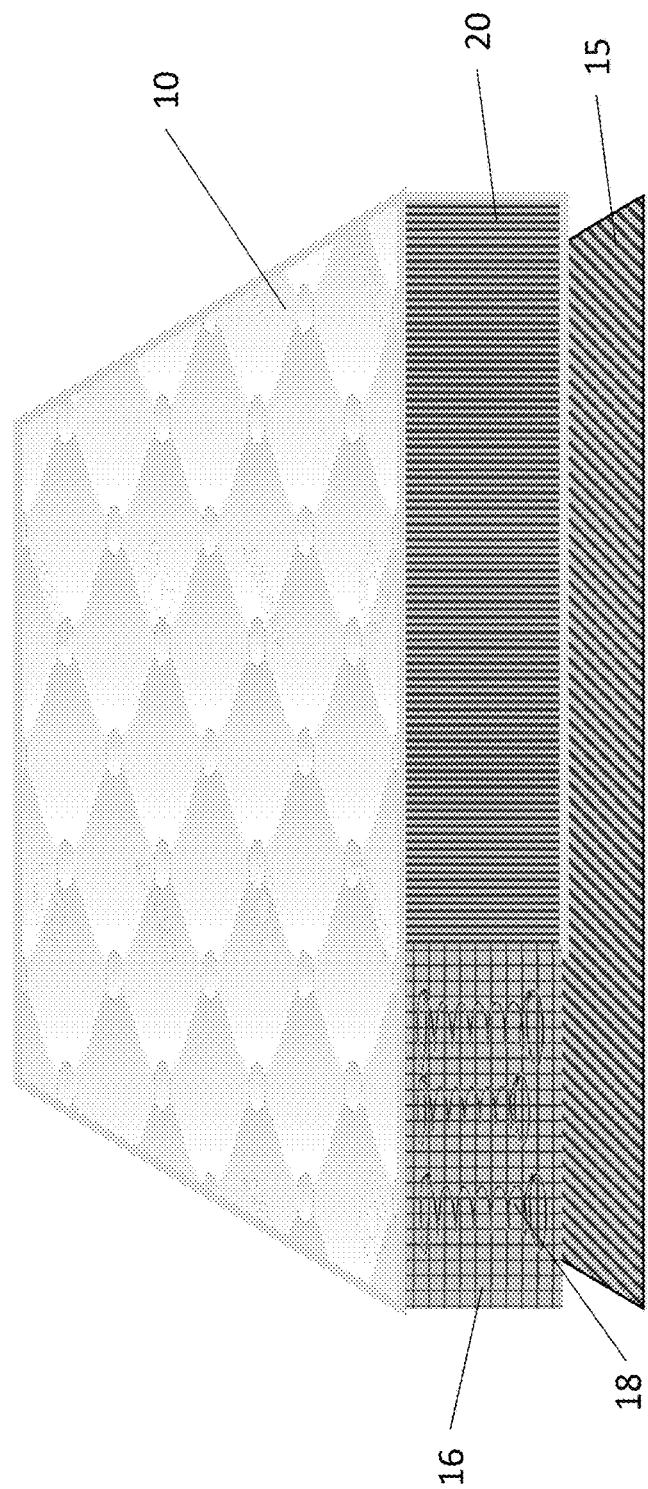
FIG. 1 is a partial exploded top perspective view of a mattress according to the present invention.

The present invention is generally directed to mattresses with a flame-retardant barrier fabric and mattresses and box-springs with a flame-retardant filler cloth-barrier fabric. The present invention uses a high-strength, highly needled, double-sided-calendered, needlepunch nonwoven fabric as a flame-retardant barrier fabric in mattress applications.

The present invention provides a highly needled, double-sided-calendered, needlepunch nonwoven as a flame-retardant filler cloth and barrier fabric for mattresses. The fabric is used on the bottom side of no-flip mattresses. It is also used as an inner barrier behind the zipper of mattress covers.

In one embodiment, the present invention is a mattress with a flame-resistant or flame-retardant filler cloth-barrier fabric; wherein the fabric is a high-strength, highly needled, double-sided-calendered, needlepunch nonwoven fabric.

None of the prior art discloses a highly needled, double-sided calendered, flame-retardant fabric with increased flame-retardance and strength relative to fabrics with similar basis weights.

Current flame barrier fabrics are made through higher-cost textile processes such as stitchbonding, knitting, weaving and spunlace/hydroentangling. Needlepunch nonwovens are typically a lower cost option to traditional textiles but up until now have not been used as a barrier fabric as they have not been able to pass the 16 CFR 1633 open flame test as described in the Federal Register/Vol. 71, No. 50/Wednesday, Mar. 15, 2006/Rules and Regulations; p. 13472-13523, and updated in 16 CFR 1633 in the version of 2011, each of which are incorporated herein by reference in their entirety.

Furthermore, the present invention overcomes some of the other drawbacks of the prior art. For example, stitchbond products do not have as strong a trap tear and cannot be perforated. Perforated material reduces labor and time in the mattress manufacturing process. Also, lightly needled products do not have enough physical strength to meet application requirements; knit products have too much elongation for use in the application, and spunlace products have too weak a Cross Direction (CD) vs Machine Direction (MD) strength for use in the application.

The current invention uses a combination of high-density needlepunching and high-temperature, high-pressure, double-sided calendering to achieve the required flame retardance, and thus offers a more cost-effective solution than the prior art methods. Surprisingly, the intensive needlepunching and calendering created a material that was stronger and with greater flame-retardant properties than expected, which permitted a reduction of basis weight and a reduction of flame-retardant fibers in the blend. Reducing the percentage of flame-retardant fibers further reduces the cost of the finished product. More specifically, the fabric of the present invention as described herein was stronger than anticipated, with a CD tensile strength and CD trap tear strength approximately double that of prior art fabrics.

Basis Weight

The fabric of the present invention has a basis weight preferably between about 3 and about 6 oz/yd².

Flame-Resistant Fiber Blend

The fabric of the present invention is preferably made with flame-resistant or flame-retardant (FR) fibers. More preferably, the fabric is made with inherently FR fibers. Even more preferably, the fabric is made with inherent FR rayon.

Advantageously, the fabric of the present invention formed with these characteristics that improves flame retardancy and/or resistance. Thus, the fabric construction and resulting structure contribute to the FR properties of the fabric, mattress and filler cloth.

The staple fibers used in the material of the present invention are preferably a blend of polyester and flame-resistant/retardant rayon (FR rayon). The blend is preferably 80/20 polyester/FR rayon. The fabric of the present invention passes 16 CFR Part 1633 (version January 2011) at ratios from 60/40 to 90/10. Thus, the process of the present invention creates a flame-retardant fabric which permits the reduced use of flame-retardant fibers.

Rayon from any process that can be made flame-resistant or flame-retardant can be used, including viscose rayon, modal rayon and lyocell rayon. Advantageously, blends of these fibers are also used in the present invention. Inherent FR rayon is the preferred blend for use with the present.

Other fibers and fiber blend can be used; for example, FR fibers such as FR acrylic fiber, FR melamine fiber, FR polyester fiber, FR polyolefin fiber, or FR resin coated fiber.

Preferably, inherent flame resistant and/or retardant fabrics and fibers are used with the fabric of the present invention; inherent fibers and fabrics made therefrom do not need to be chemically treated to be flame resistant (FR). The flame-resistant properties are an essential characteristic of the fiber chemistry. These fibers are flame resistant fibers, but from creation of the fibers themselves. Both inherent fabrics and fibers cannot lose their flame-resistant properties from normal wear or laundering. The fabric of the present invention and its application for providing a non-flip mattress will keep its flame-resistant characteristics throughout its life. More preferably, the fabric of the present invention is made from inherently flame-resistant rayon.

In an alternative embodiment, treated fibers may be used instead of or in addition to inherent FR fibers; treated fibers are those that have a flame retardant chemical that is applied during the fiber forming process, resulting in flame-resistant fibers. Fabrics made from treated fibers are flame-resistant for the life of the article. The flame retardant chemical cannot be removed by normal wear, use, or cleaning of the article. By way of example and not limitation, one fiber type is a treated 100% rayon such as commercially available Lenzing FR®, which is a man-made cellulosic fiber made by Lenzing AG, wherein the fibers get treated in the fiber forming process and are flame resistant for the life of the article.

Needlepunch

The fabric of the present invention is highly needled to increase the density of the needlepunched nonwoven fabric of the present invention.

In preferred embodiments, the nonwoven fabric of the present invention has a needle punch density between about 150 and about 220 punches/cm². Preferably, the fabric of the present invention is needled with a minimum of 190 punches per cm². In an example embodiment, the tackers provide a minimum of 60 strokes or punches per cm²; the loom 1 up punch provides a minimum of 65 strokes per cm², and the loom 2 down punch provides a minimum of 65 strokes per cm². The process thus provides a resulting fabric with the same punch density as similar weight construction fabrics used in for similar applications.

Calendering

The fabric of the present invention is calendered on both sides. In an example embodiment, the fabric of the present invention is calendered at between about 280 degrees F. and about 480 degrees F. at a pressure of between about 700 and about 1,300 PSI. Preferably, the fabric of the present invention is calendered at approximately 177 degrees C. (approximately 350 degrees F.) at a pressure of approximately 1,000 PSI.

Strength

The present method produces a high-strength fabric that is stronger, ounce per ounce, when compared to similar basis weight fabric produced by other methods (spunlace, stitchbond, etc.). For example, as shown in Table 1, the fabric of the present invention has an MD Tensile Strength that is 15-25% higher versus similar weighted FR filler cloth, a CD Tensile Strength that is 100-125% higher versus similar weighted FR filler cloth, an MD Trap Tear that is 70-285% higher versus similar weighted FR filler cloth, and a CD Trap Tear Strength that is 40-55% higher versus similar weighted FR filler cloth.

TABLE 1

|  | FR NP1 | FR NP2 | FR NP3 | FR NP4 | FR NP5 |
|---|---|---|---|---|---|
| Weight (gsm) | 205 | 165 | 155 | 135 | 115 |
| Weight (osy) | 6.0 | 4.9 | 4.6 | 4.0 | 3.4 |
| Tensile strength (lbs) |  |  |  |  |  |
| MD | 132 | 103 | 70 | 56 | 53 |
| CD | 156 | 125 | 85 | 59 | 50 |
| Elongation (%) | 10 lbs | 10 lbs | 10 lbs | 10 lbs | 10 lbs |
| MD | 2.9 | 4.0 | 4.0 | 4.7 | 4.3 |
| CD | 6.9 | 8.9 | 11.9 | 16.8 | 16.8 |
| Trap Tear (lbs) |  |  |  |  |  |
| MD | 55 | 46 | 26 | 22 | 21 |
| CD | 43 | 34 | 23 | 19 | 17 |
| Thickness (mm) | 0.85 | 0.77 | 0.61 | 0.54 | 0.47 |

This increased strength is surprising, because highly-needled fabric traditionally loses strength with heavy needlepunching, whereas in the present invention the strength has increased due to the processing described hereinabove.

For fabric weights of between 3 and 6 oz/yd², the high-strength fabric has an MD Tensile strength range of 53 to 132 lbs, a CD Tensile strength range of 50 to 156 lbs, an MD Elongation range of 2.9 to 4.3%, a CD Elongation range of 6.9 to 16.8%, an MD Trap Tear value of 21 to 55 lbs, and a CD Trap Tear value of 17 to 43 lbs.

Thickness and Density

The fabric according to the present invention is between about 0.4 and about 0.98 mm thick. Preferably, the fabric is about 0.13-0.16 mm thick per oz. of square yard in basis weight.

Referring now to the drawings in general, the illustrations are for the purpose of describing one or more preferred embodiments of the invention and are not intended to limit the invention thereto.

Mattress

FIG. 1 shows a partial exploded top perspective view of a no-flip or one-sided mattress 10 with a bottom support layer 15 composed of the highly needled, double-sided calendered, flame-retardant fabric as described herein.

Figure 2:
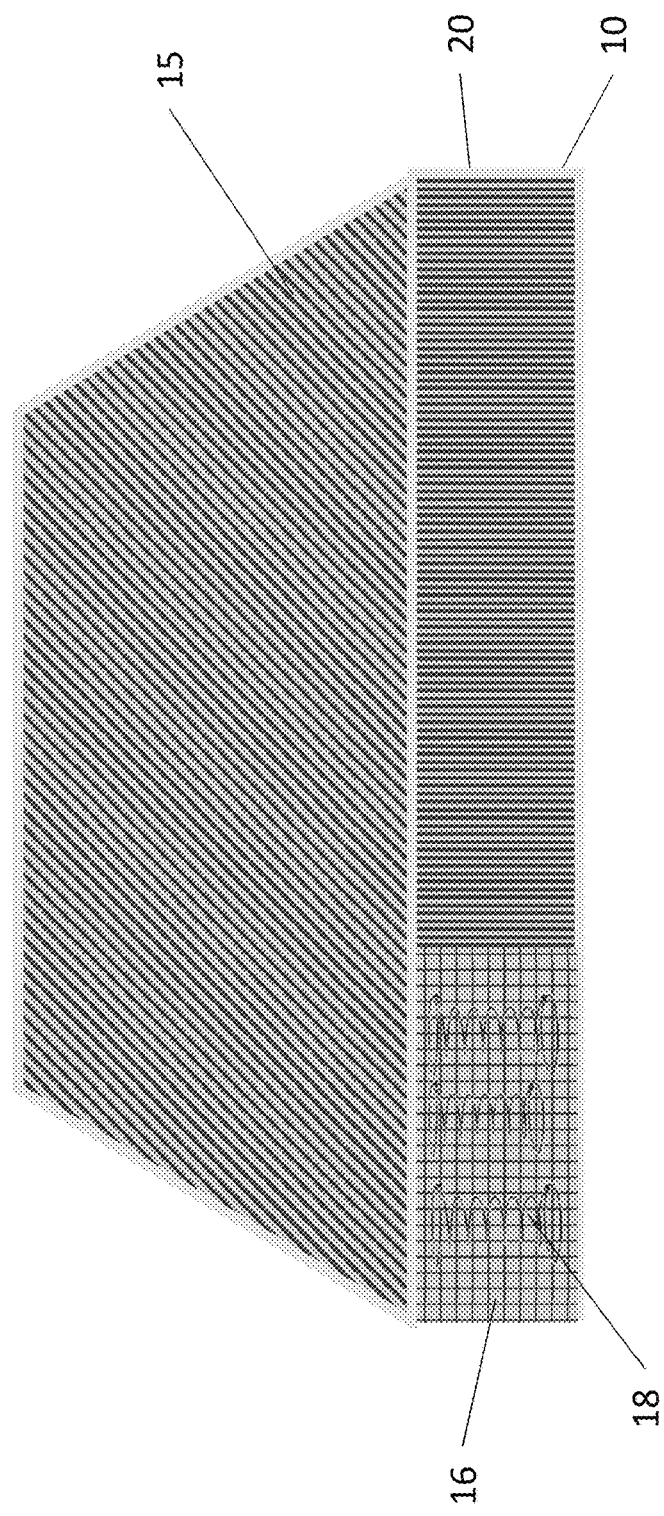
FIG. 2 is a bottom perspective view of a mattress according to the present invention.

Shown in FIG. 2 is a bottom perspective view of the mattress of FIG. 1, showing the bottom support layer 15 composed of the highly needled, double-sided calendered, flame-retardant fabric as described herein.

The bottom support layer 15 is intended to remain underneath the mattress 10 (on the non-sleeping surface). The support layer 15 is affixed or adhered to the mattress core 16 or to the depending sides 20 by mechanical or chemical means. In one embodiment, the mattress core is formed of individual core support units 18 and the support layer 15 is bonded to the individual core support units 18. This bonding holds the bottoms of the individual core support units 18 together to prevent or substantially reduce their lateral movement. In this way, the mattress 10 has greater stability while still maintaining comfort by permitting the tops of individual core support units 18 to move independently of one another. The support layer 15 is preferably bonded to the mattress core and/or individual support units 18 using a bonding material such as a hot melt glue, a latex glue or the like. Alternatively, or additionally, the support layer 15 is affixed to the cover sides by mechanical bonding, such as sewing, stapling, nailing, and the like.

The dense bottom support layer provides a durable construction to the mattress and increases its life. When bonded to the mattress core, the support layer stabilizes the bottom of the core and individual support units, thereby stabilizing the mattress.

The fabric of the present invention is also used in foundations and mattresses as a support and flame-retardant filler cloth.

The above-mentioned examples are provided to serve the purpose of clarifying the aspects of the invention, and it will be apparent to one skilled in the art that they do not serve to limit the scope of the invention. The above-mentioned examples are just some of the many configurations that the mentioned components can take on. All modifications and improvements have been deleted herein for the sake of conciseness and readability but are properly within the scope of the present invention.

The invention claimed is:

1. A non-flip mattress comprising: a top side and a bottom side and depending sides; and wherein the bottom side is covered with an inherently flame-retardant, highly needled, double-sided-calendered, needlepunch nonwoven fabric that passes an open flame test according to the requirements of 16 CFR 1633, wherein the nonwoven fabric includes a polyester and flame-resistant rayon blend, and wherein the nonwoven fabric is needled with a needle punch density between about 150 and about 220 punches per cm$^2$.

2. The non-flip mattress of claim 1, wherein the nonwoven fabric is needled with a minimum of 190 punches per cm$^2$.

3. The non-flip mattress of claim 1, wherein the nonwoven fabric includes flame-resistant acrylic fiber, flame-resistant melamine fiber, and/or flame-resistant resin coated fiber.

4. The non-flip mattress of claim 1, wherein the nonwoven fabric has a basis weight between about 3 and about 6 oz/yd$^2$, an MD tensile strength between about 53 and about 132 lbs and a CD tensile strength between about 50 and 156 lbs.

5. The non-flip mattress of claim 4, wherein the nonwoven fabric has an MD elongation between about 2.9 to about 4.3% and a CD Elongation range between about 6.9 and about 16.8%.

6. The non-flip mattress of claim 4, wherein the nonwoven fabric has an MD Trap Tear value between about 21 and about 55 lbs, and a CD Trap Tear value between about 17 and about 43 lbs.

7. The non-flip mattress of claim 1, wherein the flame-resistant rayon is inherent flame-resistant rayon.

8. A filler cloth for mattresses and box-springs comprising:
an inherently flame-retardant, highly needled, double-sided-calendered, needlepunch nonwoven fabric that passes an open flame test as per 16 CFR 1633, wherein the nonwoven fabric includes a polyester and flame-resistant rayon blend, and wherein the nonwoven fabric is needled with a needle punch density between about 150 and about 220 punches per cm$^2$.

9. The filler cloth of claim 8, wherein the nonwoven fabric is needled with a minimum of 190 punches per cm$^2$.

10. The filler cloth of claim 8, wherein the nonwoven fabric includes flame-resistant acrylic fiber, flame-resistant melamine fiber, and/or flame-resistant resin coated fiber.

11. The filler cloth of claim 8, wherein the nonwoven fabric has a basis weight between about 3 and about 6 oz/yd$^2$, MD tensile strength between about 53 and about 132 lbs and a CD tensile strength between about 50 and 156 lbs.

12. The filler cloth of claim 11, wherein the nonwoven fabric has an MD elongation between about 2.9 to about 4.3% and a CD Elongation range between about 6.9 and about 16.8%.

13. The filler cloth of claim 11, wherein the nonwoven fabric has an MD Trap Tear value between about 21 and about 55 lbs, and a CD Trap Tear value between about 17 and about 43 lbs.

14. A non-flip mattress comprising:
a top side, a bottom side and depending sides;
wherein the bottom side is covered with an inherently flame-retardant, highly needled, double-sided-calendered, needlepunch nonwoven fabric; and
wherein the nonwoven fabric consists essentially of a polyester and a flame-resistant rayon needled with at least about 190 punches per cm$^2$ and not more than about 220 punches per cm$^2$, having a basis weight between about 3 and about 6 oz/yd$^2$, an MD tensile strength between about 53 and about 132 lbs, a CD tensile strength between about 50 and 156 lbs, an MD elongation between about 2.9 to about 4.3%, a CD Elongation range between about 6.9 and about 16.8%, an MD Trap Tear value between about 21 and about 55 lbs, and a CD Trap Tear value between about 17 and about 43 lbs, wherein the nonwoven fabric and the polyester are not chemically treated with a flame retardant.

15. The non-flip mattress of claim 1, wherein the nonwoven fabric and the polyester are not treated with a flame retardant.

16. The non-flip mattress of claim 1, wherein the nonwoven fabric consists of the polyester and the flame-resistant rayon.

17. The non-flip mattress of claim 1, wherein the nonwoven fabric is manufactured using tackers providing a minimum of 60 strokes or punches per cm$^2$, a loom up punch providing a minimum of 65 strokes per cm, and a loom down punch providing a minimum of 65 strokes per cm$^2$.

18. The filler cloth of claim 8, wherein the nonwoven fabric and the polyester are not treated with a flame retardant.

19. The filler cloth of claim 8, wherein the nonwoven fabric consists of the polyester and the flame-resistant rayon.

20. The non-flip mattress of claim 14, wherein the nonwoven fabric consists of the polyester and the flame-resistant rayon.

* * * * *